March 31, 1936.   H. R. GOODALE   2,035,880
PARKING DEVICE FOR MOTOR VEHICLES
Filed Sept. 9, 1935
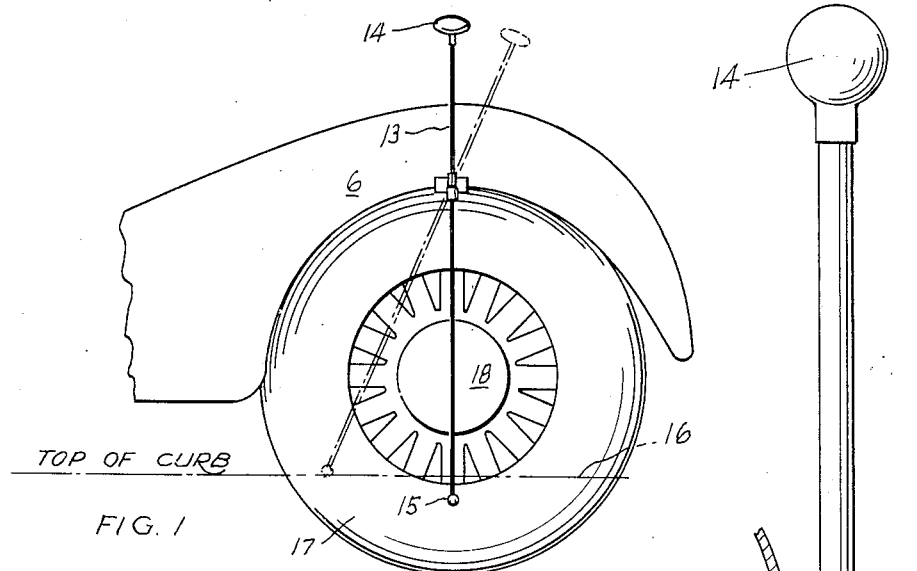
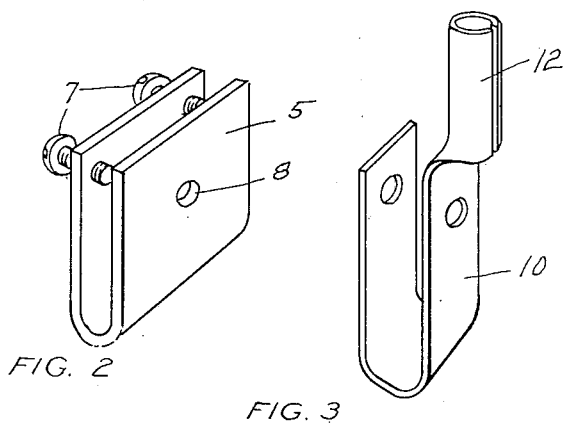
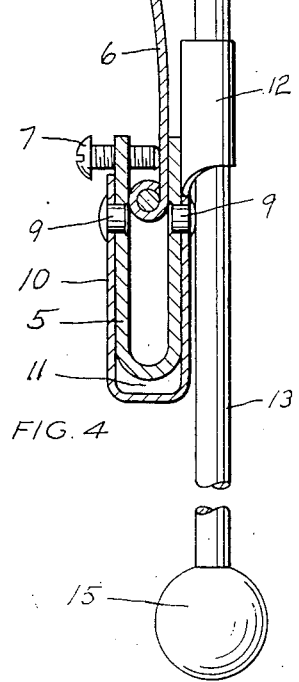
INVENTOR
Harold R. Goodale Patented Mar. 31, 1936

2,035,880

UNITED STATES PATENT OFFICE 2,035,880

PARKING DEVICE FOR MOTOR VEHICLES

Harold R. Goodale, Bristol, Conn.

Application September 9, 1935, Serial No. 39,754

7 Claims. (Cl. 116—31)

This invention relates to parking devices for motor vehicles. As is well known, the driver of a motor car cannot see the wheels and, especially with modern cars, he cannot see the fender on the side of the car opposite to the driver's seat. Hence parking alongside of a curbstone or wall is more or less guesswork as to the distance away. Some motor cars have large projecting hub caps which are likely to be damaged by contact with a curbstone and it is injurious to a tire to scrape it along the curb. Accordingly, an object of the invention is to provide a device which will aid in parking a motor car close to a curb or the like, such device being operable upon mere close approach of the vehicle to said curb. Another object is to provide an improved device which will indicate to a driver when one of the wheels is so close to the curb or other object that there is danger of injuring the tire or hub cap by contact with the curb. Upright rods have been attached to fenders to show a driver the position of the fender but this gives no indication of the location of the curb. In the drawing, Fig. 1 is a side view of a motor car with my invention attached. Fig. 2 is a perspective view of the attaching bracket. Fig. 3 is a perspective view of a clip. Fig. 4 is a vertical sectional view taken just to the rear of the upright rod.

According to my invention, I rigidly secure a stiff bracket 5 to the lower edge of a fender 6, the bracket straddling the fender and being secured by clamping screws 7. The bracket has aligned holes 8 for pivot pins 9 which project from the arms of a clip 10 which straddles the bracket 5. There is a space at 11 to provide for limited pivotal movement of the clip. The clip has a suitable split extension or sleeve 12 in which is secured a resilient rod 13. At the upper end of the rod is a suitable knob or enlargement 14 which is visible from the driver's seat and, on the lower end of the rod, is an enlargement or knob 15 placed below the hub where it will engage a curbstone 16 of average height or less. The knob is also a little out beyond the tire 17 and the hub cap 18 so that it will engage a curb or the like before the tire or hub cap engages such curb.

In operation, the driver approaches the line of the curb at an acute angle and the knob 15 engages the curb and swings the rod 13, the indicator knob 14 being swung also and so indicating to the driver that the adjacent wheel is close enough to the curb. Hence parking is facilitated and the tire and hub cap will not be injured. It is preferred to make the rod of whip material or of resilient metal or wire so that, should it be bent accidentally, it will straighten out itself or can be straightened. It is also desirable that the rod 13 and the knobs 14 and 15 be ornamental and attractive and they may be streamlined. The rod or wire may be covered with a casing similar to insulated wire while the knob 15 is desirably of rubber or the like to avoid scratching or marring. In addition to acting as a parking indicator, the upper knob 14 will by its position indicate the speed of the vehicle within limits because the lower knob is on the longer arm of the lever afforded by the pivoted rod 13 and will swing more or less to the rear depending on the wind resistance. This movement is preferably limited, as when the clearance at 11 is taken up.

I have disclosed my invention by reference to a detailed embodiment but the invention is in no way limited to the details and is susceptible of many variations in its broader aspects.

I claim:

1. The combination with a motor vehicle, of a device movably mounted thereon and adapted to engage a curbstone or the like upon mere close approach of the vehicle to such curbstone, and means for indicating such engagement to the driver.

2. The combination with a motor vehicle, of a lever pivoted thereto in approximately upright position, the upper arm of the lever being visible from the driver's seat, and the lower arm terminating below and a little outside of the hub cap in a position to strike a curbstone when the vehicle approaches closely enough thereto.

3. The combination with a motor vehicle, of a resilient rod movably mounted thereon, the rod having a portion located in a normal position to engage a curbstone or the like when the vehicle approaches closely enough thereto, and another portion of the rod being visible from the driver's seat.

4. The combination with a motor vehicle, of a lever pivoted thereto, the lower arm of the lever having a contact piece located in a normal position to engage a curbstone when the vehicle approaches closely enough thereto, and the upper arm of the lever having a knob visible from the driver's seat.

5. The combination with a motor vehicle, of a curbstone indicator pivoted thereto and comprising an arm depending alongside one of the wheels to swing lengthwise of the vehicle upon contact with a curbstone or the like as the vehicle approaches such curbstone, and means for indicating to the driver when said arm so swings.

6. The combination with a motor vehicle, of a curbstone indicator comprising a device mounted on the side of the vehicle and having a portion projecting beyond the side of the vehicle in a position to engage a curbstone or the like as the vehicle closely approaches the latter, and means for indicating to a driver on the driver's seat the fact of said engagement.

7. The combination with a vehicle fender or the like, of an arm pivoted thereto, the lower end of the arm terminating beyond one side of the vehicle in a position to engage a curbstone or the like as the vehicle approaches the latter, and means connected to said arm for automatically indicating said engagement to the vehicle driver.

HAROLD R. GOODALE.